United States Patent [19]
Leite

[11] Patent Number: 4,712,763
[45] Date of Patent: Dec. 15, 1987

[54] SECURITY DEVICE FOR OFFICE MACHINES

[75] Inventor: Peter G. Leite, Seekonk, Mass.

[73] Assignee: P.G.L. Industries, Inc., Seekonk, Mass.

[21] Appl. No.: 946,707

[22] Filed: Dec. 29, 1986

[51] Int. Cl.[4] ................ F16M 13/00
[52] U.S. Cl. ................ 248/553; 70/58
[58] Field of Search ........ 248/551, 552, 553, 205.3; 70/58, 232, 58, 418, DIG. 57, 63, 62, 71, DIG. 7; 109/52; 211/4

[56] References Cited

U.S. PATENT DOCUMENTS

| | | | |
|---|---|---|---|
| 3,850,392 | 11/1974 | Gassaway | 248/553 |
| 4,022,036 | 5/1977 | Cebuhar | 248/553 X |
| 4,246,451 | 1/1981 | Nix | 248/553 |
| 4,300,371 | 11/1981 | Herwick | 248/553 X |
| 4,556,188 | 12/1985 | Allison | 248/553 |
| 4,579,311 | 4/1986 | Spranza | 70/58 X |
| 4,585,202 | 4/1986 | Parsekian | 248/553 |
| 4,613,109 | 9/1986 | Boscacci | 70/167 X |

*Primary Examiner*—J. Franklin Foss
*Attorney, Agent, or Firm*—Salter & Michaelson

[57] ABSTRACT

A security device for an office machine comprises a housing which is securable on a mounting surface, at least one fastening element which is securable to the underside of an office machine and a locking assembly in the housing. The fastening element includes an enlarged head portion which is receivable in an aperture in the housing and the locking assembly is operable for securing the head portion of the fastening element in the housing to lock the office machine on the housing.

8 Claims, 6 Drawing Figures

SECURITY DEVICE FOR OFFICE MACHINES

BACKGROUND AND SUMMARY OF THE INVENTION

The instant invention relates to office machines, such as typewriters, computers, and word processors, and more particularly to a security device for office machines.

A variety of types of relatively sophisticated and expensive electronic office machines have been developed in recent years. In this regard, various types of electronic typewriters, office computers and word processors have become highly popular and have been found to be extremely valuable tools in many offices and businesses. In fact, word processors and electronic typewriters have become virtually essential in many professional offices, and office computers have become increasingly important in many offices and small businesses. However, it has been found that because office machines of these types are often relatively expensive, the problem of theft with respect to such machines has become increasingly significant. Further, it has been found that the problem of theft has been compounded by the fact that many of the sophisticated electronic office machines which are currently available are actually lighter in weight and smaller in dimension than conventional mechanical machines, and hence they are often more easily transportable than conventional machines. Accordingly, a substantial need has developed for an effective device for preventing the theft of office machines from both offices and businesses.

The device disclosed in the U.S. Pat. No. 3,850,392 to Gassaway, which represents the closest prior art to the instant invention of which the applicant is aware, was developed as a result of the increasing need to provide some means for preventing the theft of office machines. The Gassaway device comprises a flexible pad which is bondable by an adhesive to a mounting surface and has a plurality of upwardly protruding loop devices thereon, a cover which is receivable over the pad, and a plurality of locks on the cover which are operative for locking the cover to the loop devices on the pad, In order to secure an office machine to a mounting surface, such as a table or desk, utilizing a Gassaway-type device, the cover of the device is bolted to the underside of the office machine, the pad is adhesively secured to the mounting surface, and the cover is locked to the pad. In this regard, the cover is constructed so that the bolts which are operable to secure it to an office machine are inaccessible as long as the cover is in a locked position on the pad so that a person cannot surreptitiously remove the machine from the mounting surface while the cover is locked to the pad.

While the Gassaway device represented a significant development in the art at the time it was developed, it has nevertheless been found to have certain disadvantages. Specifically, it has been found that since it is necessary to bolt the cover portion of the Gassaway device to the underside of an office machine in order to lock the machine on a mounting surface, it is generally impossible or at least impractical to thereafter use the machine at different locations unless the cover is unbolted from the machine. Accordingly it is generally not practical to temporarily move an office machine to another location once it has been secured at one location using a Gassaway-type device.

The instant invention provides an improved security device for office machines which is effective and simple to operate and which is adapted to enable an office machine to be quickly and easily disassembled therefrom for use at different locations. Specifically, the the device of the instant invention comprises a housing having spaced top and bottom walls, wherein the bottom wall is adapted to be secured on a mounting surface and the top wall has at least one aperture therein. The device further comprises at least one fastening element which is securable to the underside of an office machine and has a locking end portion which is receivable in the aperture in the housing, and means for releasably locking the locking end portion of the fastening element in the aperture in the housing to releasably lock the office machine on the housing. The top wall of the housing preferably has four apertures therein at spaced locations, and the security device preferably comprises four fastening elements which are securable on the underside of an office machine by suitable means such as a permanent adhesive; and the locking means is preferably operable for releasably locking the locking end portions of the four fastening elements in the apertures. In this connection, the apertures are preferably positioned so that they correspond to the positions of the feet on the underside of a conventional office machine, and hence it is normally possible to assemble the fastening elements with an office machine in place of the feet thereof. Alternatively, for use with office machines having feet which are located in different positions, the security device further includes an adaptor plate which is securable to the underside of an office machine, and which is adapted to receive the fastening elements thereon for securing the office machine to the housing. In this case, the adaptor plate is preferably constructed so that it is permanently securable to the underside of an office machine in place of the feet thereof. The locking means of the security device preferably comprises a plate which is mounted in the housing so that it is slidable between a locked position wherein it engages the locking end portions of the fastening elements to secure them in the apertrues, and an unlocked position wherein the plate is disengaged from the locking end portions of the fastening elements so that they can be released from the housing. The locking end portions of the fastening elements preferably comprise shank portions and enlarged head portions on the shank portions, and the plate preferably has openings therein having enlarged portions which are adapted to receive the head portions, and reduced portions which are of smaller dimension than the head portions of the fastening elements. Further, the plate is preferably constructed so that when it is in the unlocked position thereof the enlarged portions of the openings are aligned with the apertures in the top wall of the housing, and so that when it is in the locked position thereof the reduced portions of the openings are aligned with the openings in the plate. Accordingly, the fastening elements are receivable in the enlarged portions of the openings when the plate is in the unlocked position thereof, and by thereafter moving the plate to the locked position, the fastening elements are passed into the reduced portions of the openings to lock the fastening elements in the housing.

As a result of the above, it is seen that the instant invention provides an effective security device which is easily operable for locking an office machine, such as a typewriter or a computer, on a mounting surface, such as a desk or a table. The housing is adhesively securable to a mounting surface in a manner which prevents it from being easily removed from the mounting surface, and the fastening elements of the device are easily securable to the underside of an office machine to permit the office machine to be assembled with the security device. Further, the security device is easily operable between the locked and unlocked positions thereof for securing an office machine to a mounting surface or for removing it therefrom, respectively. Further, the housing portion of the device is not permanently attached to an office machine so that the office machine can easily be temporarily moved to different locations. Still further, because of the unique construction of the security device, it is extremely difficult for unauthorized persons to remove an office machine which is attached to the device from a mounting surface.

Accordingly, it is a primary object of the instant invention to provide an effective security device for an office machine.

Another object of the instant invention is to provide a security device for an office machine wherein the office machine can be quickly and easily disassembled from the device.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE INVENTION

Figure 1:
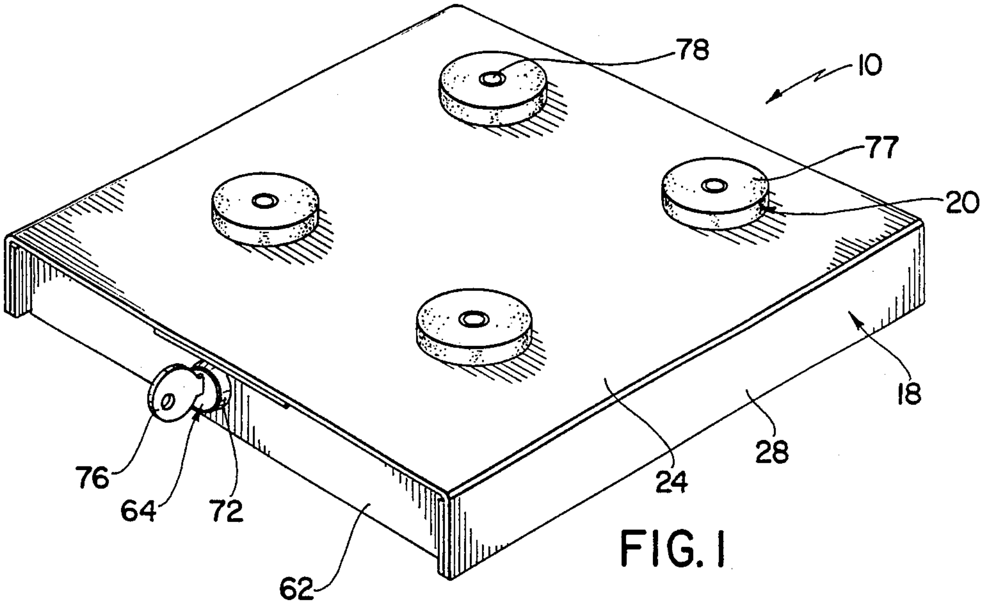
FIG. 1 is a perspective view of the device of the instant invention in the locked position.
Figure 2:
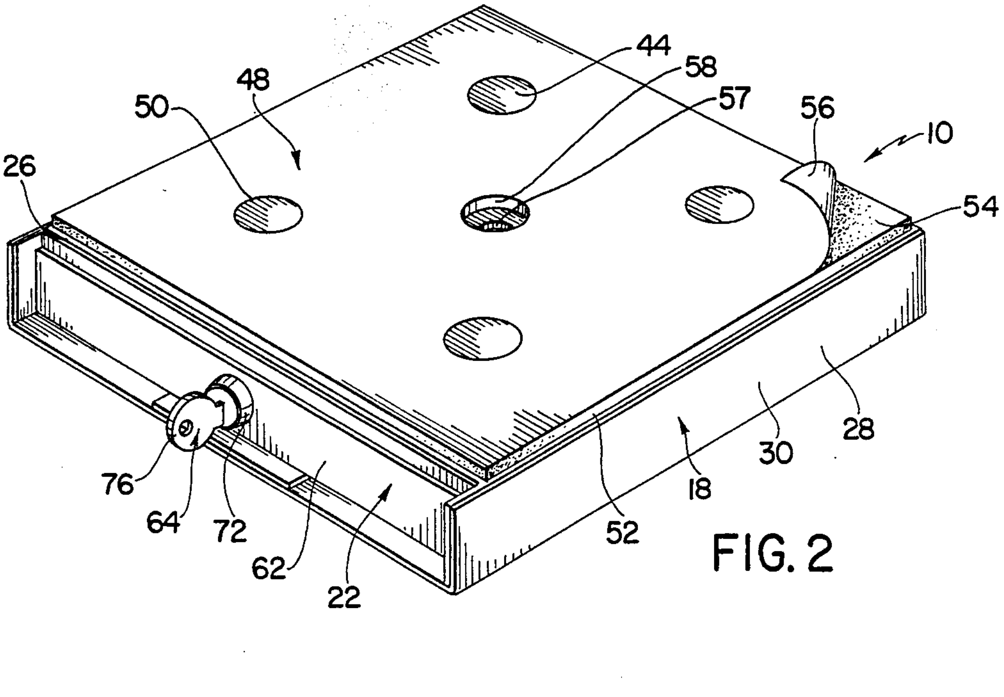
FIG. 2 is a bottom perspective view thereof.
Figure 3:
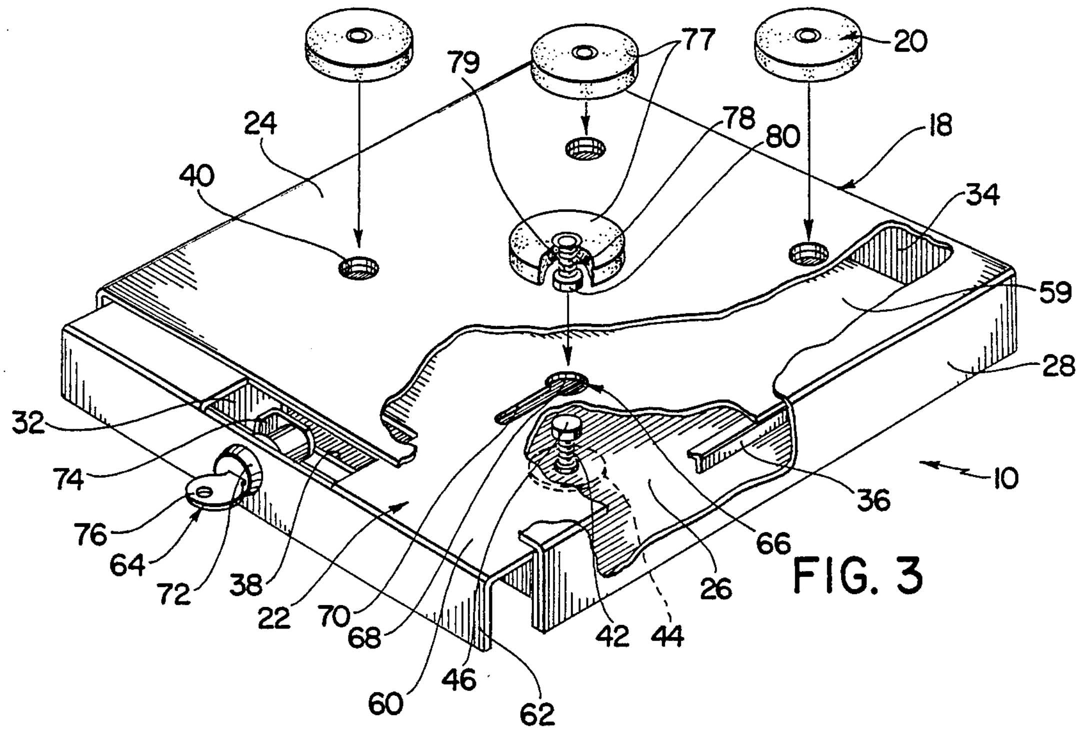
FIG. 3 is a partially exploded fragmentary perspective view of the device in the unlocked position.
Figure 4:
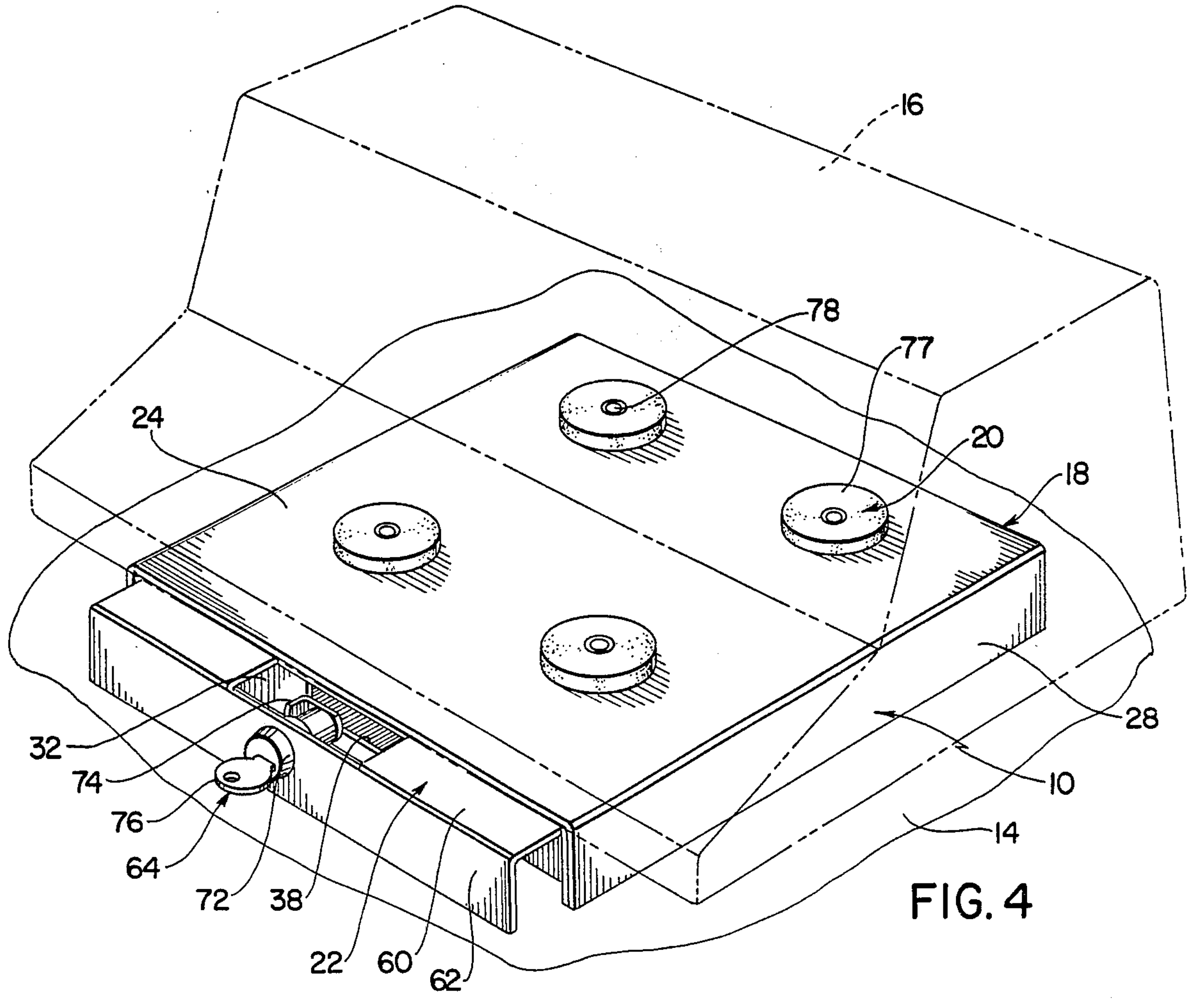
FIG. 4 is a perspective view of the device in the unlocked position in combination with an office machine.
Figure 5:
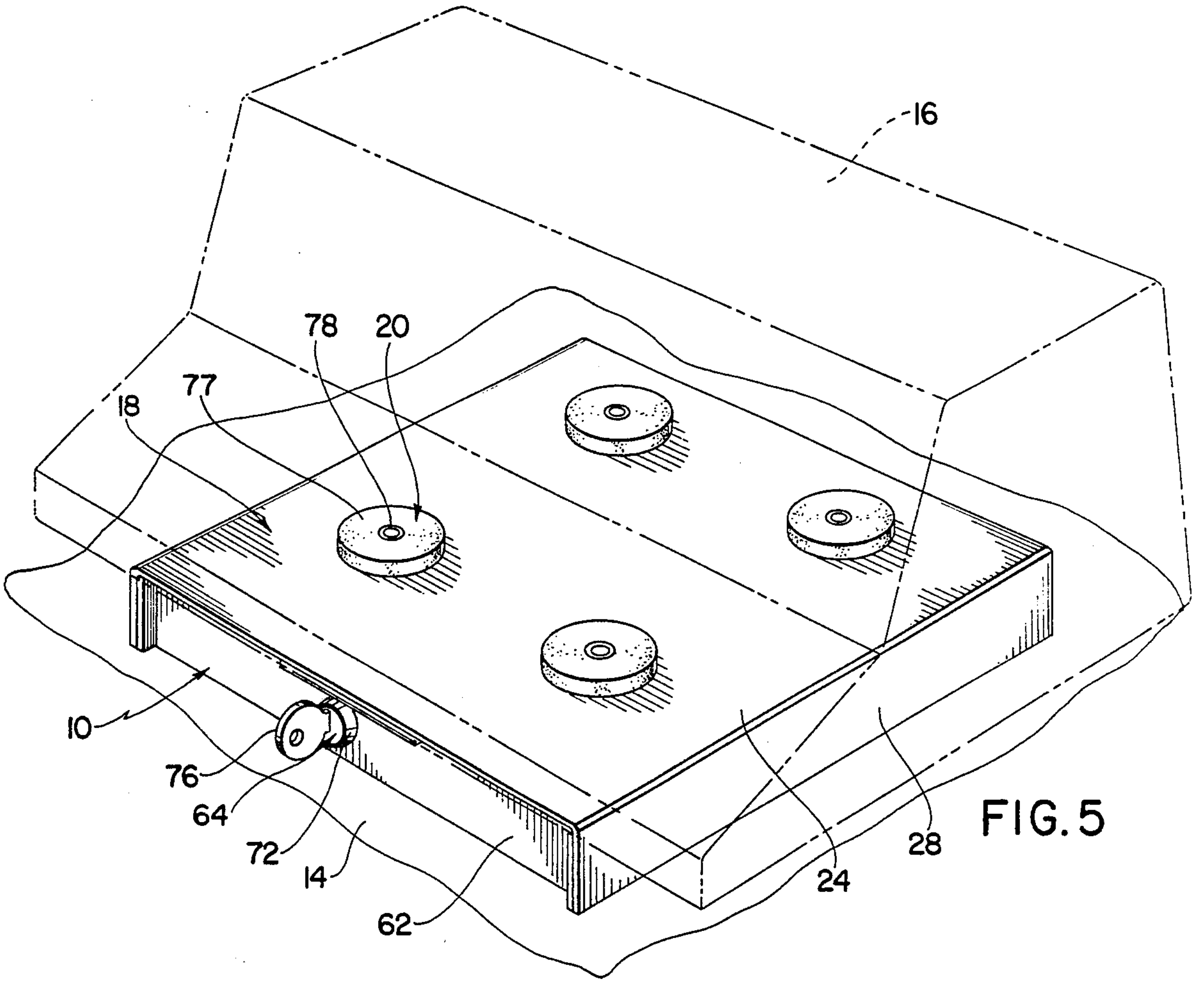
FIG. 5 is a similar view with the device in the locked position.
Figure 6:
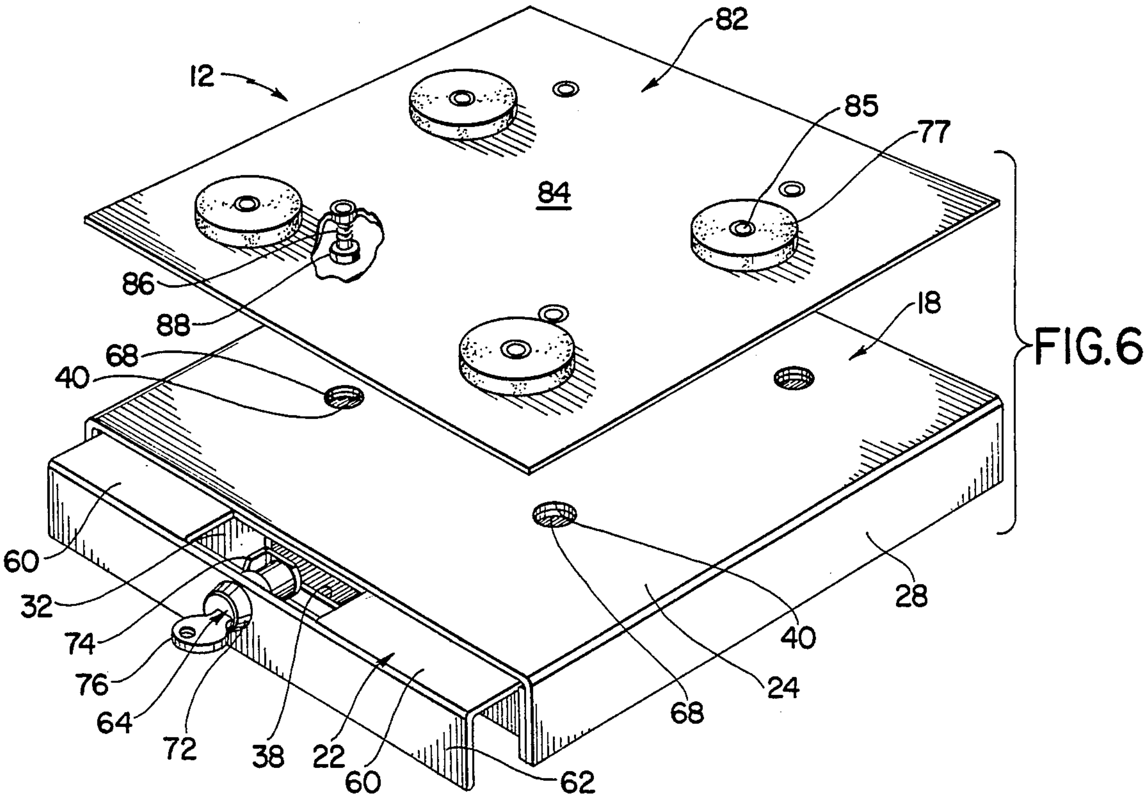
FIG. 6 is an exploded perspective view of a second embodiment of the device in the unlocked position.

Referring now to the drawings, a first embodiment of the security device of the instant invention is illustrated in FIGS. 1–5 and generally indicated at 10, and a second embodiment of the security device is illustrated in FIG. 6 and generally indicated at 12. As illustrated in FIGS. 4 and 5, the security device 10 is securable to a mounting surface 14 for securing an office machine 16 to the mounting surface 14 in a manner which normally prevents the office machine 16 from being removed from the surface 14 by an unauthorized person. The security device 12 is operable in a similar manner, although it is adapted for use in combination with certain types of office machines which could not readily be attached to the device 10 as will hereinafter be more fully set forth. In any event, the security devices 10 and 12 are adapted for use in securing office machines, such as typewriters, computers, word processor terminals, etc. to desks, tables, counters, etc. in various business and professional offices in order to prevent the office machines from being removed by thieves.

As illustrated most clearly in FIGS. 3 and 4, the security device 10 generally comprises a housing generally indicated at 18 which is securable to a mounting surface 14, a plurality of fastening elements generally indicated at 20 which are securable to an office machine such as the office machine 16, and a locking assembly generally indicated at 20 which is operable for releasably locking the fastening elements 20 to the housing 18 in order to secure the office machine 16 to the mounting surface 14.

The housing 18 is preferably made of a relatively heavy guage sheet metal in an enclosed rectangular configuration of reduced height, and it comprises spaced top and bottom walls 24 and 26, respectively, spaced side walls 28 and 30, which enclose the sides of the housing 18 and extend between the top and bottom walls 24 and 26, respectively, and spaced front and rear walls 32 and 34, respectively, which enclose the front and rear ends of the housing 18 and also extend between the top and bottom walls 24 and 26, respectively. Extending rearwardly along the inner sides of the side walls 28 and 30 in closely spaced relation to the top wall 24 are track members 36, and an opening 38 is provided in the central portion of the front wall 32. A plurality of spaced apertures 40 are provided in the top wall 24 and are preferably oriented so that when a common type of conventional office machine, such as the office machine 16, is positioned on the top wall 24, the apertures 40 are substantially aligned with the feet on the office machine. Threadedly received in the bottom wall 26 are a plurality of release members 42 having release discs 44 which are disposed adjacent the outer side of the bottom wall 26. The release members 42 further include heads 46 which are disposed within the housing 18 so that they are aligned with the apertures 40 and normally disposed approximately equidistant between the top wall 24 and the bottom wall 26. The release members 42 are operable by rotating the heads 46 thereof in a clockwise direction for moving the release discs 44 away from the outer surface of the bottom wall 26. As illustrated most clearly in FIG. 2, an adhesive pad 48 is provided on the underside of the bottom wall 26, and a plurality of openings 50 are formed in the pad 48 so that they are aligned with the discs 44 and dimensioned to enable the discs 44 to travel through the openings 50. The pad 48 preferably comprises a relatively thin sheet 52 of a compressible rubberized material which is permanently bonded to the bottom wall 26, and a pressure sensitive adhesive 54 having a relatively high tensile strength on the bottom surface of the sheet 52. A removable protective layer 56 is overlaid on the adhesive 54 in order to protect the adhesive 54 until the security device 10 is ready to be placed on a mounting surface. The sheet material 52 preferably comprises a suitable durable and flexible rubberized material, and it is provided in order to compensate for minor irregularities in the surface configuration of a mounting surface on which the device 10 is mounted. The adhesive 54 preferably comprises a suitable pressure sensitive adhesive such as the one utilized in the above-mentioned U.S. Pat. No. 3,850,392 to Gassaway. An air hole 57 extends through the central portion of the bottom wall 26, and communicates with a hole 58 which extends through the pad 48.

Referring to FIG. 3, the locking plate assembly 22 is more clearly illustrated; and it comprises a plate portion 59, a pair of arms 60 which extend integrally forwardly from the plate portion 59, a front wall 62 which extends integrally downwardly from the arms 60, and a locking mechanism 64 which is mounted in the central portion of the front wall 62. The plate portion 59 is mounted in the housing 18 so that it is slidably supported on the track members 36 and positioned adjacent the underside of the top wall 24. The plate portion 59 is dimensioned so that it is slidable between the locked position illustrated in FIGS. 1, 2 and 5, and the unlocked position illustrated in FIGS. 3 and 4, and it has a plurality of openings 66 formed therein. The opening 66 each have an enlarged portion 68 which communicates with a reduced slot portion 70, and they are oriented on the plate portion 59 so that when the locking plate assembly 22 is in the unlocked position thereof illustrated in FIGS. 3 and 4, the enlarged portions 68 are aligned with the apertures 40, and so that when the locking plate assembly is in the locked position thereof illustrated in FIGS. 1, 2 and 5, the reduced slot portions 70 thereof are aligned with the apertures 40. The arms 60 extend forwardly through openings in the front wall 32 of the housing 18. The locking mechanism 64 comprises a lock 72 having a latching arm 74 and a key 76, and it is mounted on the front wall 62 so that when the plate assembly 22 is in the locked position thereof, the inner portion of the locking mechanism 64 is received through the opening 38 in the front wall 32. Further, the locking mechanism 64 is positioned so that when the plate assembly 22 is in the locked position thereof, the key 76 is rotatable to cause the latching arm 74 to engage the inner side of the front wall 32 to prevent the plate assembly 22 from being moved to the unlocked position thereof. Accordingly, by removing the key 76 when the locking mechanism 64 is in the locked position, the plate assembly 22 can be locked in the locked position so that it cannot be opened. Further, as will be noted, when the plate assembly 22 is in the locked position, the front wall 62 fully covers the opening 38 in the front wall 32 to prevent unauthorized tampering with the locking mechanism 64.

The fastening elements 20 are illustrated most clearly in FIG. 3, and they each comprise a rubberized disc 77 and a threaded bolt 78 which is threadedly received in the respective disc thereof and has a shank 79, and an enlarged terminal head or locking end portion 80. The discs 77 are adjapted to be permanently secured to the underside of an office machine with a suitable permanent adhesive. The heads 80 of the bolts 78 are dimensioned to be received through the enlarged portions 68 of the openings 66 but not through the reduced slot portions 70 thereof, whereas the shanks 79 are dimensioned to be received in the slot portions 70.

For use of the security device 10, the protective sheet 56 is first removed from the adhesive 54 on the rubberized layer 52. The security device 10 is then placed in a desired orientation on a mounting surface 14 and pressure is applied to the device 10 to secure it to the mounting surface 14 with the adhesive 54. Thereafter, the heads 46 of the release members 42 are rotated to position the discs 44 in contact with the mounting surface 14 in order to prevent a thief from passing a thin wire between the sheet 52 and the mounting surface 14 to remove the device 10 therefrom. In order to secure the office machine 16 to the device 10, the discs 77 of the fastening elements 20 are preferably adhesively secured to the underside of the machine 16 with a permanent adhesive, and they are oriented so that they are aligned with the openings 40 in the housing 18. In this connection, in many cases it is possible to remove the original feet of the machine and to then secure the discs 77 in place of the original feet. In any event, thereafter, the device 10 is moved to the unlocked position thereof by unlocking the locking mechanism 64 and moving the plate assembly 22 to the unlocked position wherein the enlarged portions 68 of the openings 66 are aligned with the openings 40. Thereafter, the office machine 16 is placed on the top wall 24 so that the heads 80 of the bolts 78 pass through the apertures 40 and the enlarged portions 68 of the openings 66. The plate assembly 22 is then moved to the locked position thereof, so that the shanks 79 of the bolts 78 are passed into the reduced slot portions 70 of the openings 66 to secure the bolts 78 in the housing 18. The locking mechanism 64 is then rotated to cause the latching arm 74 to engage the inner side of the front wall 32 to prevent the plate assembly 22 from being moved to the unlocked position thereof, and the key 76 is removed from the device 10 to prevent unauthorized removal of the office machine 16 from the device 10. Thereafter, if it is desired to remove the device 10 from the surface 14, the office machine 16 is first removed from the housing 18 and then the release members 42 are rotated in a clockwise direction to move the housing away from the surface 14 with the release discs 44.

Referring now to FIG. 6, the second embodiment of the device of the subject invention is illustrated and generally indicated at 12. The device 12 comprises a housing 18 and a locking plate assembly 22. However, instead of the fastening elements 20, the device 12 includes an adaptor plate assembly 82 for securing an office machine thereto. The adaptor plate assembly 82 comprises a metal plate 84, a plurality of the pads 77 which are mounted on the upper side of the plate 84 with bolts 85, and a plurality of fastening elements 86 having locking end portions or heads 88. The fastening elements 86 are positioned on the plate 84 so that the heads 88 thereof are receivable in the openings 40 in a manner similar to the heads 80 of the bolts 78, for securing the adaptor plate assembly 82 to the housing 18. The pads 77 are securable to the underside of an office machine with a suitable permanent adhesive for permanently securing the adaptor plate assembly 82 to the office machine. However, since it is not necessary for the pads 77 on the adaptor plate assembly 86 to be aligned with the openings 40, they can be positioned at other locations on the plate 84 which are more suited for certain particular types of office machines.

It is seen, therefore, that the instant invention provides an effective security device for office machines. The housing 18 is adapted to be firmly secured to a mounting surface so that an office machine attached thereto cannot be removed by an unauthorized person. In this regard, the overall construction of the housing 18 and the slide plate assembly 22 make it extremely difficult for a thief to remove an office machine 16 from either the device 10 or the device 12 without unlocking the locking mechanism 64 thereof. However, when the locking mechanism 64 is unlocked, the locking plate assembly 22 can easily be moved to the unlocked position to permit the office machine 16 to be removed. Further, when an office machine is removed from either the device 10 or the device 12, it is completely disengaged from the housing 18 thereof, and it can be temporarily repositioned at a new location by simply removing the bolts 78 or 86. Hence, it is seen that the security devices 10 and 12 represent significant advancements in the art which have substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A security device for an office machine comprising a substantially closed housing having spaced top and bottom walls, said bottom wall being adapted to be secured on a mounting surface, said top wall having an aperture therein, a fastening element securable to the underside of said office machine and having a locking end portion which is receivable in said aperture when said fastening element is secured to said office machine, a plate slidably mounted in said housing between said top and bottom walls thereof and operable from the exterior of said housing when said fastening element is secured to said office machine and said locking end portion is secured in said aperture for sliding said plate between an engaged position wherein it engages said locking end portion to secure same in said aperture and a disengaged position wherein it is disengaged from said locking end portion and said fastening element is releasable from said housing, said housing and said plate being constructed so that said locking end portion is inaccessible from the exterior of said housing when said plate is in said engaged position thereof, and locking means for releasably retaining said plate in the engaged position thereof.

2. In the security device of claim 1, said top wall having four of said apertures at spaced locations therein, said security device further comprising four of said fastening elements all of which are securable to said office machine, said locking means being operable for releasably locking each of said fastening element locking end portions in a different one of said apertures.

3. In the security device of claim 1, said bottom wall further characterized as being adhesively securable to a supporting surface.

4. In the security device of claim 1, said bottom wall having a pressure sensitive adhesive on the bottom surface thereof for securing said bottom wall on a mounting surface.

5. In the security device of claim 1, said fastening element comprising a bolt, said locking end portion comprising an enlarged head on said bolt, said plate engaging said head to secure said locking end portion in said aperture.

6. In the security device of claim 5, said plate further characterized as having an opening therein, said opening having an enlarged portion of greater dimension than said head and a reduced portion of smaller dimension than said head, said head being receivable through said enlarged portion of said opening when said plate is in said unlocked position thereof and being aligned with said reduced portion of said opening and therefore being locked in housing by said plate when said plate is thereafter moved to said locked position.

7. The device of claim 1 further comprising an adaptor plate, said fastening element being secured to said adaptor plate, said adaptor plate being securable to the underside of said office machine for securing said office machine to said housing.

8. In the device of claim 1, said fastening elements comprising substantially flat discs which are adhesively securable to the underside of an office machine.

* * * * *